(No Model.)

U. H. ODELL.
GRINDING MILL.

No. 279,880. Patented June 19, 1883.

Attest:
Charles S. Hyer.
J. A. Rutherford

Inventor:
Udolpho H. Odell,
by Wood & Boyd
his Attorneys

N. PETERS. Photo-Lithographer, Washington, D. C.

UNITED STATES PATENT OFFICE.

UDOLPHO H. ODELL, OF DAYTON, OHIO.

GRINDING-MILL.

SPECIFICATION forming part of Letters Patent No. 279,880, dated June 19, 1883.

Application filed February 11, 1882. (No model.)

*To all whom it may concern:*

Be it known that I, UDOLPHO H. ODELL, a citizen of the United States, residing at the city of Dayton, in the county of Montgomery and State of Ohio, have invented certain new and useful Improvements in Grinding-Mills, of which the following is a specification.

This invention relates to improvements in the roller grinding or reducing machines for which Letters Patent No. 250,954 were issued to me on the 13th day of December, A. D. 1881, and has for its objects to improve the means employed to adjust the arms carrying the adjustable roller, to provide improved means to permit the adjustable roller to yield and move outward when subjected to undue strain or pressure, and to improve the means employed to simultaneously adjust the hopper-gate mechanism and the adjustable roller. These objects I accomplish by the mechanism illustrated in the accompanying drawings, in which—

Figure 1:
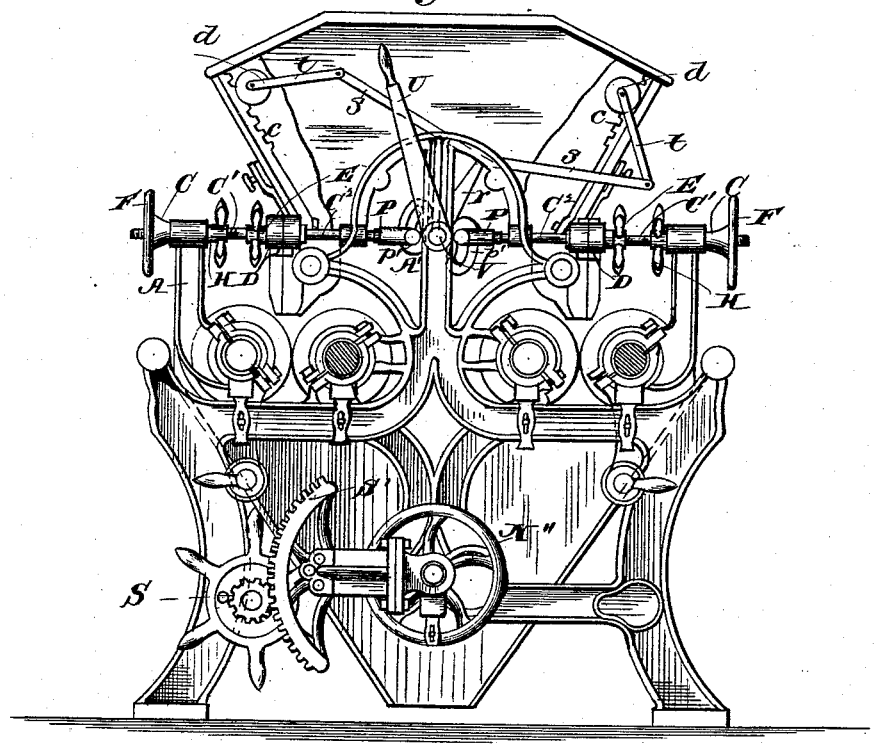
Figure 2:
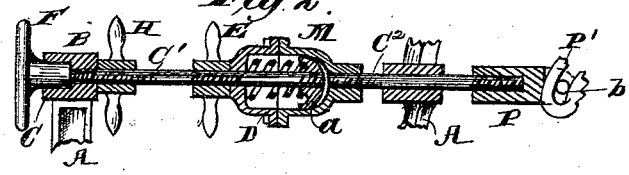

Figure 1 represents an end elevation of a roller grinding-mill embodying my invention, and Fig. 2 is a longitudinal sectional view of the devices for adjusting the roller journal-arm and the tension of the spring.

In the drawings, the letters A indicate the swinging arms on which the outer rollers are journaled, and A' the frame of the machine on which the inner rollers are journaled and driven by a pulley, N'', which is vertically adjustable by means of a rack, S', and pinion S, all substantially as in my Letters Patent before mentioned. The shafts or rods for adjusting the outer rollers are each composed of two parts or sections, C' and C², the inner ends of the parts or sections C' being provided with heads $a$, arranged in housings or barrels D, and between said heads and the outer ends of the housings or barrels and coiled around the parts or sections C' are arranged coiled springs M. The parts or sections C' swivel in the housings or barrels, and their outer ends are screw-threaded and arranged in bearings B on the upper ends of the swinging arms A, and on said threaded ends are arranged the adjusting screw-nuts F, the latter having cylindrical hubs or bosses C, which serve to retain the parts or sections C' of the roller-adjusting shafts or rods in proper central position in the bearings B. The parts or sections C² of the said shafts or rods are secured at one end to the housings or barrels D and their inner adjacent ends are provided with bifurcated heads P, secured to links P' by means of pins $b$, passing through segmental slots in said links, which links are rigidly fixed to a through-shaft, V. To this shaft is fixed a lever, U, the object of which is to turn said shaft, and thereby transmit a horizontal movement to the roller-adjusting shafts or rods, in order to simultaneously operate the swinging arms A, and thereby adjust the outer rollers in unison toward or from the inner rollers. The parts or sections C' of the roller-adjusting shafts are provided, adjacent to the bearings B, and housings or barrels D, with screw-threads, on which are respectively arranged the lock-nuts H and E, the latter serving to regulate the tension of the coiled springs M, and the former serving to retain the parts or sections C' of the shafts or rods in any position to which they may be adjusted by the screw-nuts F.

In operation, when the nuts E are against the housings or barrels D, and the nuts H are loosened or turned away from the bearings B, the screw-nut F can be turned to adjust the swinging arms A and their attached rollers toward or from the stationary rollers mounted in bearings on the frame A, and after the desired adjustment has been effected the nuts H are tightenened up against the bearings B to secure the parts in their proper relative position.

If it is desired to adjust the tension of one or both of the springs M, the lock-nuts H and E are loosened, when the screw-nut F can be operated to move the part or section C' of the roller-adjusting shaft the proper distance to produce the desired tension on the spring, after which the lock-nuts are tightened up.

It will be observed that the spiral spring and housing or barrel serve as a yielding or elastic connection between the adjacent ends of the parts or sections C' and C², composing the roller-adjusting shaft, and afford efficient means whereby the adjustable roller can automatically yield and move outward when subjected to undue strain or pressure.

It will also be seen that by the arrangement described the outer rollers can be simultaneously moved toward or from the inner rollers by means of the single lever U; or the rollers can be separately or independently adjusted by means of the screw-nuts F and lock-nuts H; and, further, that such adjustments of the outer rollers can be accomplished without affecting the operation or tension of the springs which permit the outer rollers to yield.

I do not desire to limit myself to the particular means described for connecting the roller-adjusting shafts or rods with the through-shaft, as other connecting devices can be employed; and, further, I do not limit myself to making the shaft V a through-shaft, as such can be a short stud at each end of the machine, in which event the pins b are made in the form of through-shafts, and thus produce the same effect.

The gates or slides which control the discharge of the material from the hopper are arranged to slide vertically, and each is provided with a rack, c, which engages a pinion, d, the latter being attached to one end of the crank-arms t, which are pivoted at their other ends to links s, which are in turn pivoted to a crank-arm, r, fixed to the shaft V. By this arrangement when the said shaft is turned by means of the lever U to adjust the outer rollers, as before described, the gates or slides are adjusted simultaneously therewith by crank-arm r and links s, crank-arms t, and pinions d, to open or close the hopper-throat, according to the direction in which the shaft V is turned. The adjusting-lever U will be furnished with some suitable means for retaining it in its adjusted position—such, for example, as a pawl and ratchet. By arranging the adjusting-lever U directly on the shaft V, I render the lever-adjusting devices more simple than in my former Letters Patent.

While I have shown my invention applied to a double-roller mill, I wish it to be understood that I do not confine my invention thereto, as it is applicable to a mill having a single pair of rollers, and the claims are designed to cover such. I have only illustrated one end of the machine; but it will be obvious that the roller-adjusting mechanism, as well as the swinging arm or arms, will be duplicated at the opposite end for a single pair of rollers or a double-roller mill.

Having thus described my invention, what I claim is—

1. In a roller grinding-mill, the combination, with the co-operating grinding-rollers, of a roller-adjusting shaft or rod at each end of the machine, and each composed of two parts, and a spring-connection joining the inner or adjacent ends of the two parts or sections, and a swinging lever connected with the said roller-adjusting shaft, substantially as described.

2. In a roller grinding-mill, the combination, with the co-operating grinding-rollers, of a roller-adjusting shaft or rod at each end of the machine, and each composed of two parts or sections, and a housed spring-connection joining the inner or adjacent ends of said parts or sections, and a lever mechanism for operating said roller-adjusting shaft, substantially as described.

3. In a roller grinding-mill, the combination of the upright pivoted journal-arms, the grinding-roller journaled in said arms, a roller-adjusting shaft or rod at each end of the machine, and each composed of two parts or sections, a housing in which the inner end of one of said parts or sections is swiveled, and a spring inclosed by the housing and connecting it with the inner end of the other part or section of the shaft, and lever mechanism for operating the shafts to swing the journal-arms, substantially as described.

4. In a roller grinding-mill, the combination of the shaft V and the lever U, secured directly to said shaft, with the adjustable grinding-roller, the hopper-gate mechanism, and connecting devices between the said grinding-roller, hopper-gate mechanism, and lever, substantially as described.

In testimony whereof I have hereunto set my hand in the presence of two subscribing witnesses.

UDOLPHO H. ODELL.

Witnesses:
O. M. GOTTSCHALL,
C. A. STOWE.